United States Patent
Kawai

(10) Patent No.: US 8,149,155 B2
(45) Date of Patent: Apr. 3, 2012

(54) RANGE MEASURING METHOD, RANGE MEASURING APPARATUS, NON-CONTACTED IC MEDIUM AND RANGE MEASURING SYSTEM

(75) Inventor: Takehiro Kawai, Kyoto (JP)

(73) Assignee: Omron Corporation, Kyoto (JP)

( * ) Notice: Subject to any disclaimer, the term of this patent is extended or adjusted under 35 U.S.C. 154(b) by 155 days.

(21) Appl. No.: 12/338,538

(22) Filed: Dec. 18, 2008

(65) Prior Publication Data
US 2009/0195438 A1    Aug. 6, 2009

(30) Foreign Application Priority Data
Dec. 18, 2007   (JP) ................. P.2007-325887

(51) Int. Cl.
*G01S 13/00* (2006.01)
(52) U.S. Cl. ................. 342/42; 340/10.3; 455/21
(58) Field of Classification Search .......... 342/42–51, 342/118, 127; 340/10.3–10.6; 455/21
See application file for complete search history.

(56) References Cited

U.S. PATENT DOCUMENTS

| | | | |
|---|---|---|---|
| 3,339,202 A * | 8/1967 | Earp | 342/394 |
| 4,804,961 A * | 2/1989 | Hane | 342/125 |
| 5,703,573 A * | 12/1997 | Fujimoto et al. | 340/10.3 |
| 5,751,765 A | 5/1998 | Matsubara | |
| 6,868,073 B1 | 3/2005 | Carrender | |
| 7,580,378 B2 | 8/2009 | Carrender et al. | |
| 7,796,016 B2 | 9/2010 | Fukuda | |
| 7,826,552 B2 * | 11/2010 | Kobayashi et al. | 375/295 |
| 2002/0008615 A1 | 1/2002 | Heide et al. | |
| 2002/0080864 A1 | 6/2002 | Kuttruff et al. | |
| 2004/0213169 A1 | 10/2004 | Allard et al. | |
| 2005/0099269 A1 * | 5/2005 | Diorio et al. | 340/10.51 |
| 2006/0286957 A1 * | 12/2006 | Oishi | 455/323 |
| 2007/0001814 A1 * | 1/2007 | Steinke et al. | 340/10.31 |

FOREIGN PATENT DOCUMENTS

| | | |
|---|---|---|
| CN | 1697435 A | 11/2005 |
| EP | 0 730 251 A2 | 9/1996 |
| EP | 1 225 422 A1 | 7/2002 |
| EP | 1 863 190 A1 | 12/2007 |
| WO | WO 87/03698 | 6/1987 |
| WO | WO 00/45328 A1 | 8/2000 |
| WO | WO 01/94974 A2 | 12/2001 |
| WO | WO 2006/095463 | 9/2006 |
| WO | WO 2007/018162 A1 | 2/2007 |

* cited by examiner

*Primary Examiner* — Timothy A Brainard
(74) *Attorney, Agent, or Firm* — Dickstein Shapiro LLP

(57) ABSTRACT

A method of measuring a range from a reader unit to a non-contacted IC medium, includes: transmitting an inquiry signal at a first frequency from the reader unit to the non-contacted IC medium; causing the non-contacted IC medium to perform modulation to modulate the first frequency by using a second frequency to obtain a modulated frequency, and causing the non-contacted IC medium to respond to a response signal at the modulated frequency; causing the reader unit to receive the response signal to acquire a plurality of frequency components; calculating a phase difference between signals of at least two of the acquired plurality of frequency components; and measuring the range by using the phase difference.

11 Claims, 9 Drawing Sheets

RANGE MEASURING METHOD, RANGE MEASURING APPARATUS, NON-CONTACTED IC MEDIUM AND RANGE MEASURING SYSTEM

BACKGROUND OF THE INVENTION

The present invention relates to a range measuring method, a range measuring apparatus, a non-contacted IC medium and a range measuring system, which measures a range, for example, from a reader unit to a non-contacted IC medium.

There is a range measuring apparatus that measures the range to a non-contacted IC medium using multiple frequencies (refer to International Publication WO 2006/095463). The range measuring apparatus controls an RFID tag (non-contacted IC medium) to transmit two times a R/W request signal that requests transmission of a tag response signal. At this time, a frequency controller controls a PLL portion to transmit respective R/W request signals by transfer frequencies differing from each other. A phase information acquisition portion detects fluctuation amounts in phase of tag response signals transmitted by the transfer frequencies differing from each other, respectively, and calculates the range between a reader/writer and the RFID tag based on the fluctuation amounts in the phase. Therefore, the range between the reader/writer and the RFID tag can be accurately calculated.

However, it cannot be necessarily said that the non-contacted IC medium always stops at a fixed position. And, there is a case where the range to a non-contacted IC medium in motion is requested to be obtained. In such a case, since the above-described range measuring apparatus carries out transmission and receiving of different frequencies at different timings, a deviation occurs at the receiving timing. Therefore, where the non-contacted IC medium is conveyed at a high speed, it is difficult to accurately calculate the range.

SUMMARY

It is therefore an object of the invention to provide a range measuring method, a range measuring apparatus, a non-contacted IC medium and a range measuring system, which are capable of carrying out highly accurate range measurements even if a non-contacted IC medium is in motion.

In order to achieve the object, according to the invention, there is provided a method of measuring a range from a reader unit to a non-contacted IC medium, the method comprising: transmitting an inquiry signal at a first frequency from the reader unit to the non-contacted IC medium; causing the non-contacted IC medium to perform modulation to modulate the first frequency by using a second frequency to obtain a modulated frequency, and causing the non-contacted IC medium to respond to a response signal at the modulated frequency; causing the reader unit to receive the response signal to acquire a plurality of frequency components; calculating a phase difference between signals of at least two of the acquired plurality of frequency components; and measuring the range by using the phase difference.

Phase shift keying may be used for the modulation.

Frequency shift keying may be used for the modulation.

The modulation may be digital modulation, and the plurality of frequency components may be high frequency components generated in the digital modulation.

The response signal may be separated into an upper side band and a lower side band in order to acquire the plurality of frequency components.

According to the invention, there is also provided an apparatus, operable to measure a range from a reader unit to a non-contacted IC medium, the apparatus comprising: a communication unit, transmitting an inquiry signal at a first frequency from the reader unit to the non-contacted IC medium, and receiving a response signal from the non-contacted IC medium; a frequency component acquiring unit, acquiring a plurality of frequency components from the response signal; and a range measuring unit, calculating a phase difference between signals of at least two of the acquired plurality of frequency components, and measuring the range by using the phase difference.

According to the invention, there is also provided a non-contact IC medium, comprising: a communication unit, receiving an inquiry signal at a first frequency from a reader unit, and responding to a response signal to the reader unit; and a modulation unit, performing modulation to modulate the first frequency by using a second frequency to obtain a modulated frequency, wherein the communication unit responds to the response signal at the modulated frequency.

According to the invention, there is also provided a range measuring system, comprising: a non-contacted IC medium; and a range measuring apparatus, operable to measure a range from a reader unit to the non-contacted IC medium, the apparatus comprising: a first communication unit, transmitting an inquiry signal at a first frequency from the reader unit to the non-contacted IC medium, and receiving a response signal from the non-contacted IC medium; a frequency component acquiring unit, acquiring a plurality of frequency components from the response signal; and a range measuring unit, calculating a phase difference between signals of at least two of the acquired plurality of frequency components, and measuring the range by using the phase difference, wherein the non-contacted IC medium comprises: a second communication unit, receiving the inquiry signal at the first frequency from the reader unit, and responding to the response signal to the reader unit; and a modulation unit, performing modulation to modulate the first frequency by using a second frequency to obtain a modulated frequency, and the second communication unit responds to the response signal at the modulated frequency.

The inquiry signal may be made into a signal for which the reader unit causes the non-contacted IC medium to respond, and for example, may be made into a signal including a command to send an ID.

The response signal may be made into a signal for which the non-contacted IC medium responds to the reader unit, and for example, may be made into a signal to send an ID.

The upper side band may be made into a USB (Upper Side Band), and the lower side band may be made into an LSB (Lower Side Band).

The frequency component acquiring unit may be a unit for acquiring, for example, frequency components while separating the same into USB components and LSB components, and may be composed as a unit for acquiring frequencies with the same separated as per component.

The range measuring unit may be composed of a unit for measuring a range by per-component frequencies, and may be composed of a unit for calculating appropriately using numerical expressions.

The range measuring apparatus may be made into a reader unit that can communicate with a non-contacted IC medium.

DETAILED DESCRIPTION OF PREFERRED EMBODIMENTS

A description is given of one embodiment of the invention with reference to the following drawings.

Figure 1:
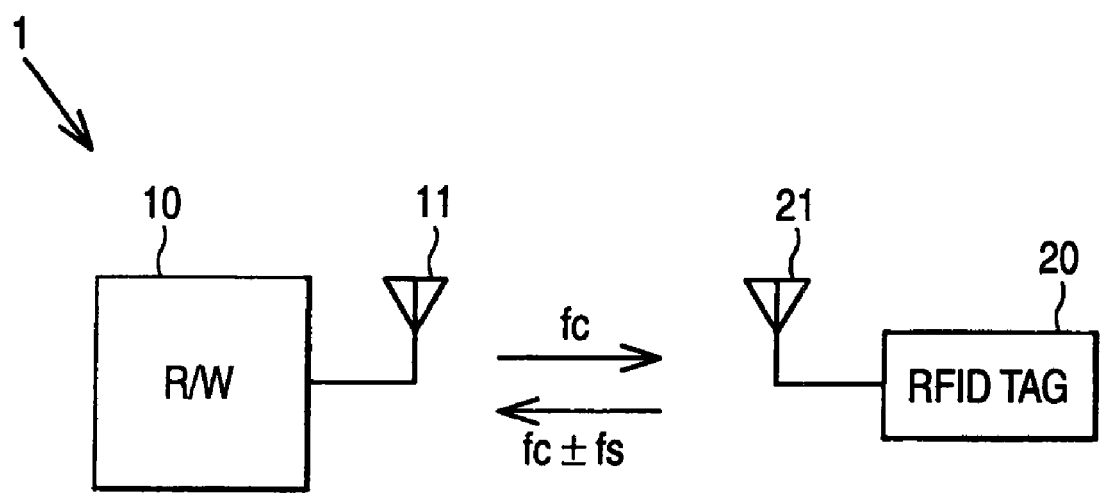
FIG. 1 is a system configuration view of a range measuring system.
Figure 2A:
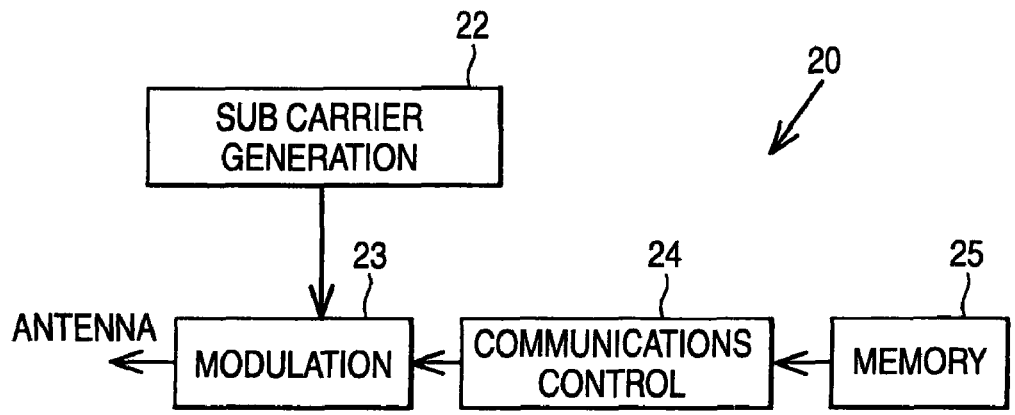
FIGS. 2A, 2B and 2C are schematic views describing a configuration of an RFID tag.
Figure 2B:
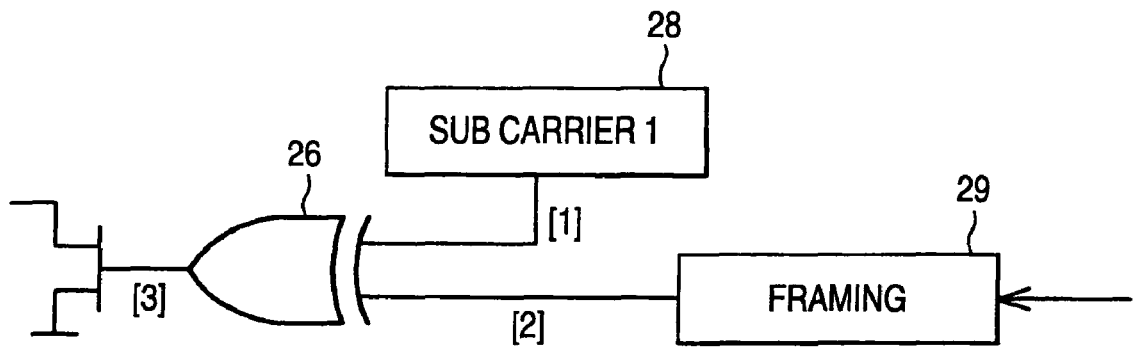
Figure 2C:
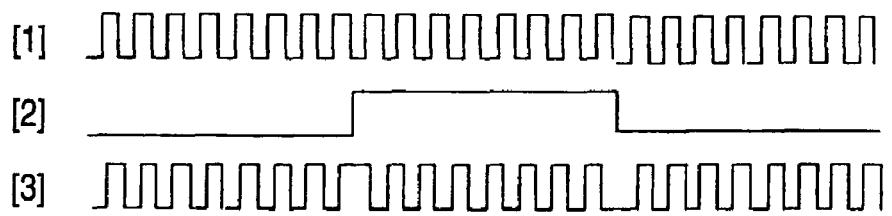
Figure 3A:
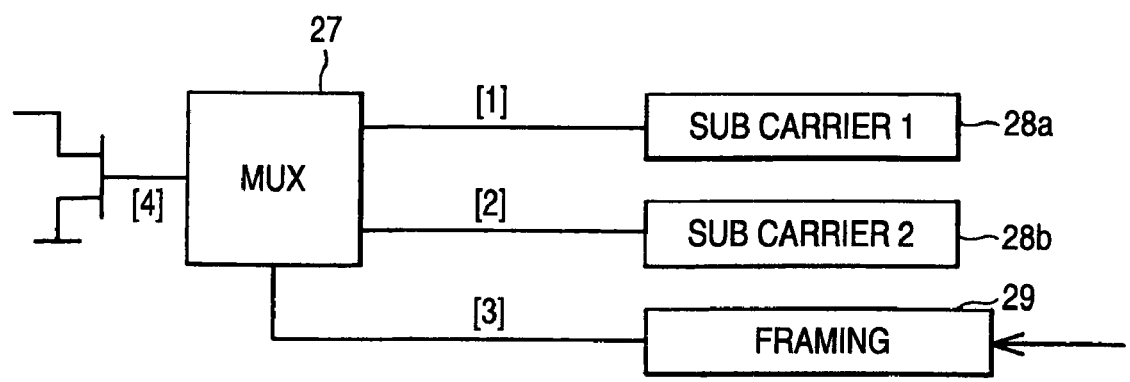
FIGS. 3A and 3B are schematic views describing a configuration of a reader/writer.
Figure 3B:
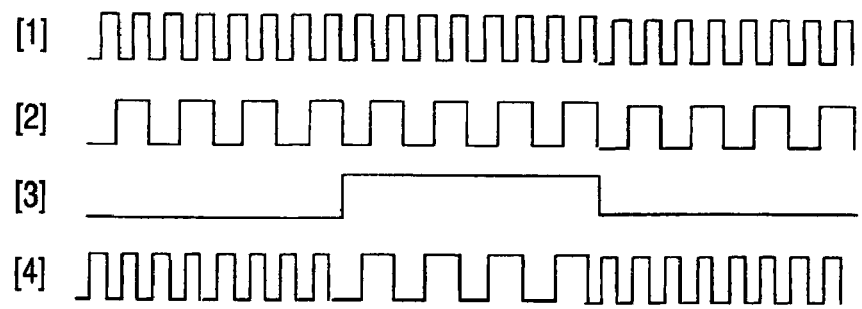

FIG. 1 is a configuration view of a range measuring system 1, FIGS. 2A to 2C are schematic views of a configuration of an REID tag (Radio Frequency Identification Tag) 20, and FIGS. 3A and 3B are schematic views of a configuration of reader/writer 10.

The range measuring system 1 is composed of a reader/writer 10 and an RFID tag 20.

The REID tag 20 is provided with a sub carrier generation portion 22, a modulation portion 23, a communications controller 24 and a memory portion 25 in addition to an antenna 21 as shown in FIG. 2A.

The antenna 21 communicates with the reader/writer 10 in a non-contacted state. The antenna may be composed of an appropriate antenna such as a UHF antenna or a loop antenna.

The sub carrier generation portion 22 generates a sub carrier (sub carrier wave) whose frequency is different from the first frequency (frequency fc) used by the reader/writer 10 as a carrier wave. In the embodiment, phase shift keying (PSK) or frequency shift keying (FSK) may be selectively used as the modulation system of the sub carrier. Also, a lower frequency than the first frequency is adopted for the sub carrier.

The memory portion 25 stores ID being identification information of the RFID tag 20 and other data.

The communications controller 24 carries out communications control by which it receives a command from the reader/writer 10, modulates digital data in the memory portion 25 and responds to the reader/writer 10. The communications controller 24 is composed of digital circuits (logic) to execute parallel processing such as sub carrier generation.

The modulation portion 23 modulates the sub carrier based on digital data transmitted from the communications controller 24. It is composed so that the modulation is selectively carried out based on two types of PSK and FSK.

First, a detailed description is given of the PSK. As shown in FIG. 2B, the calculator 26 obtains an exclusive logic sum (XOR: exclusive or) of the sub carrier 28 (sub carrier wave shown at [1] in FIG. 2C) and digital data (data shown at [2] in FIG. 2C) that is framed by adding a preamble and CRC (Cyclic Redundancy Check), etc., in a framing portion 29, and an after-calculated signal (signal shown at [3] in FIG. 2C) is generated. And, reflected signals of the first frequency fc, which are from the reader/writer 10, by the antenna 21 are controlled by changing the impedance of the antenna 21 based on the signals. The reflected signals by the antenna 21 become a response to the reader/writer 10.

A detailed description is given of FSK. As shown in FIG. 3A, output signals (signals shown at [4] in FIG. 3B) are generated by changing a sub carrier 28a and a sub carrier 28b by a multiplexer 27 (MUX) using the sub carrier 28a (sub carrier wave shown at [1] in FIG. 3B), sub carrier 28b (sub carrier wave shown at [2] in FIG. 3B) and digital data (data shown at [3] in FIG. 3B) framed by adding a preamble and a CRC thereto at the framing portion 29. And, the signals are sent back from the antenna 21 to the reader/writer 10.

Also, the RFID tag 20 is provided with a demodulator and a decoder (illustration of which is omitted). The demodulator demodulates signals received by the antenna 21 and acquires command signals transmitted from the reader/writer 10. The decoder decodes demodulated command signals, and takes out coded command data, wherein processes of reading (transmitting a designated area of the memory portion 25) and writing (writing data following the command in the designated area of the memory portion 25) are carried out.

In addition, for the RFID tag 20, there are two types, one of which is a passive type that does not have any power source and responds to actuation by an electric field or magnetic field and the other of which is a semi-passive type that internally includes a power source and responds when receiving a response request from the reader/writer 10. Therefore, the RFID tag 20 can synchronize with carrier waves transmitted from the reader/writer 10.

Figure 4A:
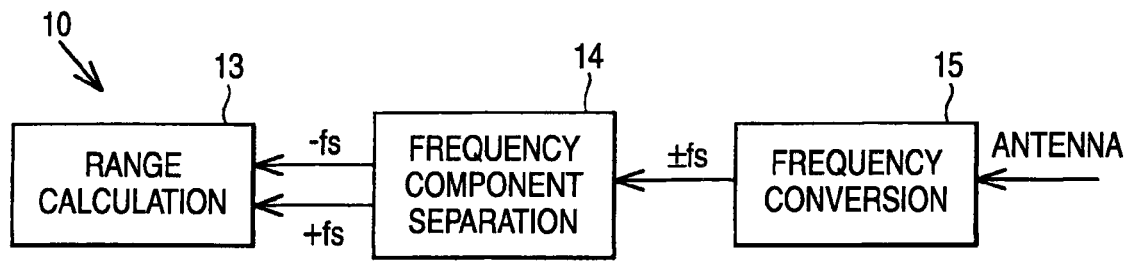
FIGS. 4A, 4B and 4C are schematic views describing a detailed configuration of a reader/writer.

The reader/writer 10 is provided with the antenna 11, and is also provided with a controller and a memory portion, illustration of which is omitted. The memory portion stores various types of data and also stores a range measuring program to measure the range. In addition, the reader/writer 10 includes a range calculating portion 13, a frequency component separating portion 14 and a frequency converting portion 15 as shown in FIG. 4A.

The frequency converting portion 15 carries out frequency conversion in regard to signals received from the antenna 11, and sends the frequency component (±fs) of a sub carrier to the frequency component separating portion 14.

The frequency component separating portion 14 separates the received frequency component (±fs) into USB and LSB.

Figure 4B:
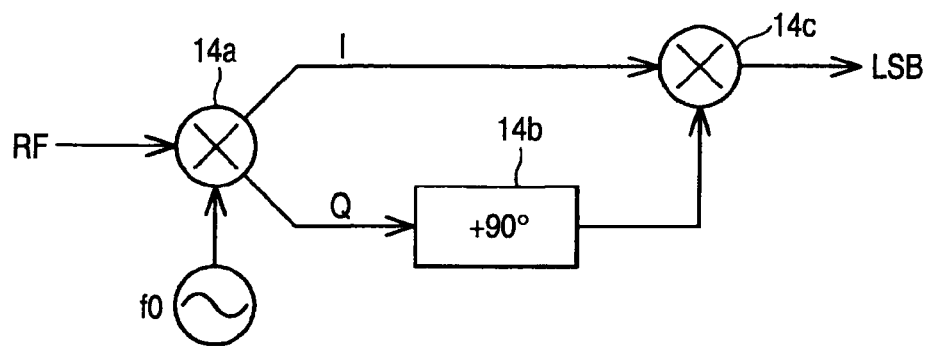

Herein, the LSB can be picked up by the configuration shown in FIG. 4B. That is, first, I components and Q components are extracted from input frequencies by means of an orthogonal mixer 14a, wherein the phase of the Q components is changed by +90° by a phase converter 14b. And, the after-phase changed Q component and I components for which the phase has not been changed are synthesized by a synthesizer 14c, thereby extracting the LSB.

Figure 4C:
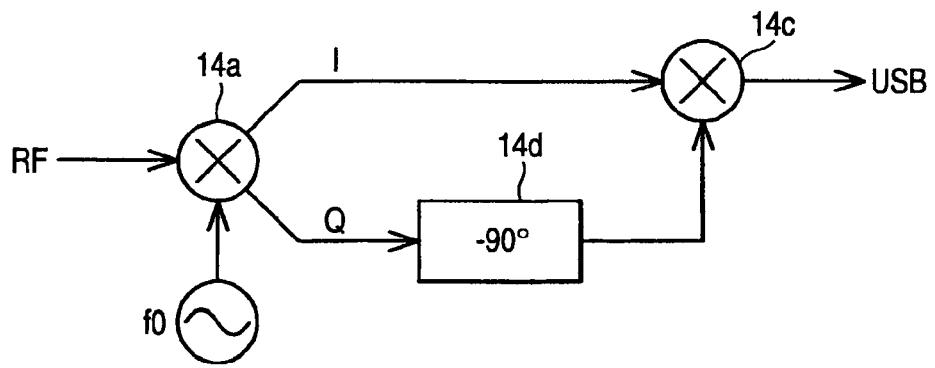

In addition, USB can be picked up by the configuration shown in FIG. 4C. That is, first, I components and Q components are extracted from input frequencies by an orthogonal mixer 14a, wherein the phase of the Q components is changed by −90° by a phase converter 14d. And, the after-phase changed Q component and I components for which the phase has not been changed are synthesized by a synthesizer 14c, thereby extracting the USB.

The range calculating portion 13 shown in FIG. 4A calculates the range using the USB and LSB that are extracted by the frequency component separating portion 14. The range calculation is carried out as follows.

First, where it is assumed that the phase of the signal of the first frequency fc transmitted by the reader/writer 10 is the reference phase, the signals of the first frequency fc reach the RFID tag 20 located at a distance r from the reader/writer 10 and is reflected therefrom, and phase of carrier waves returned to the reader/writer 10 becomes Φt. And, the phase Φru of the USB signal, which is generated by modulation with respect to the signal of the first frequency fc at the RFID tag 20 and has reached the reader/writer 10, for the reference phase and the phase Φrl of the LSB signal for the reference phase may be expressed by the following expression.
[Mathematical Expression 1]
Phase Φt of Carrier Wave $$\Phi t = 2\pi \cdot fc \cdot r/c$$

*r: Range, c=3×10⁸ m/s (Light speed)
[Mathematical Expression 2]
Phase Delay Φru of USB $$\Phi ru = 2\pi \cdot (fc+fs) \cdot r/c$$

*r: Range, c=3×10⁸ m/s (Light speed)
[Mathematical Expression 3]
Phase Delay Φrl of LSB $$\Phi rl = 2\pi \cdot (fc-fs) \cdot r/c$$

*r: Range, c=3×10⁸ m/s (Light speed)
Therefore, the range from the reader/writer 10 to the RFID tag 20 may be calculated by the following expression.

$$\Phi ru - \Phi rl = [2\pi \cdot (fc+fs) \cdot r/c] - \quad \text{(Mathematical expression 4)}$$
$$[2\pi \cdot (fc-fs) \cdot r/c]$$
$$= 2\pi \cdot 2fs \cdot (r/c)$$

[Mathematical Expression 5]
Range r $$r = (c \cdot \Delta\Phi)/(2\pi \cdot 2fs)$$

Figure 5A:
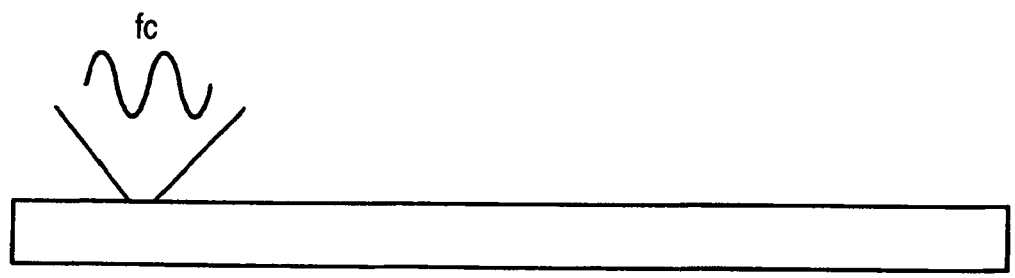
FIGS. 5A, 5B and 5C are schematic views describing a PSK system.
Figure 5B:
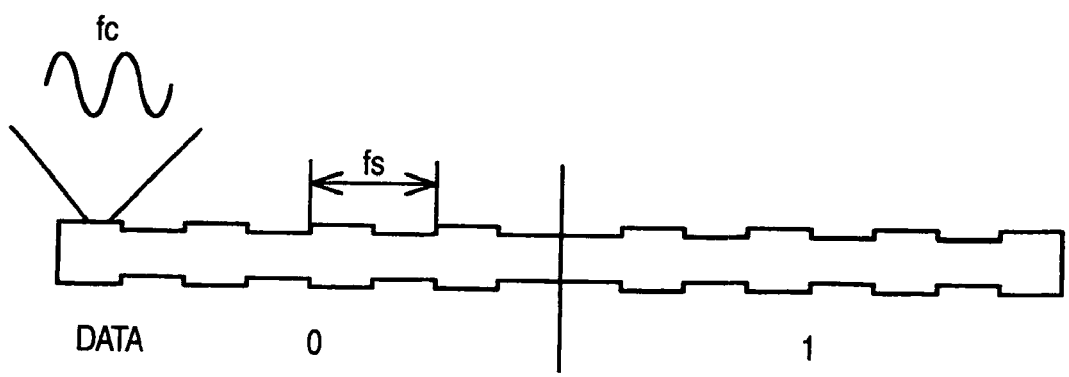
Figure 5C:
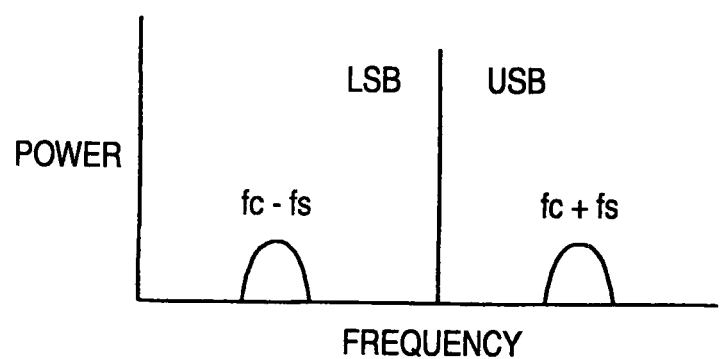

*ΔΦ (Phase difference)=Φru−Φrl
FIGS. 5A to 5C are schematic views describing a carrier wave, a response signal, USB and LSB where PSK is used.

As shown in FIG. 5A, an inquiry signal (carrier wave) transmitted by the reader/writer 10 is a signal of the first frequency fc.

As shown in FIG. 5B, the response signal (reflected wave) responded by the RFID tag 20 is a signal obtained by synthesizing the first frequency fc and the second frequency fs. For the response signal, data are expressed in the PSK system.

As shown in FIG. 5C, the response signal can pick up USB and LSB by separation of frequency components.

Figure 6A:
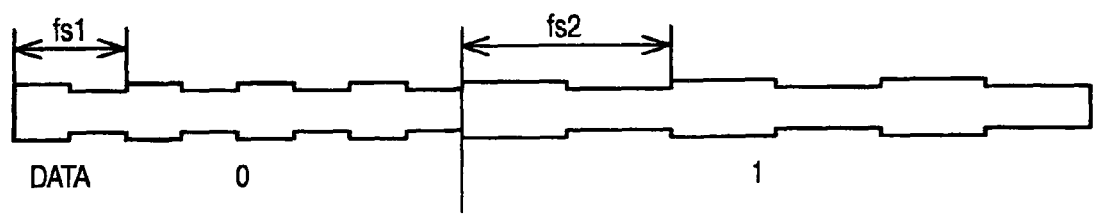
FIGS. 6A and 6B are schematic views describing an FSK system.
Figure 6B:
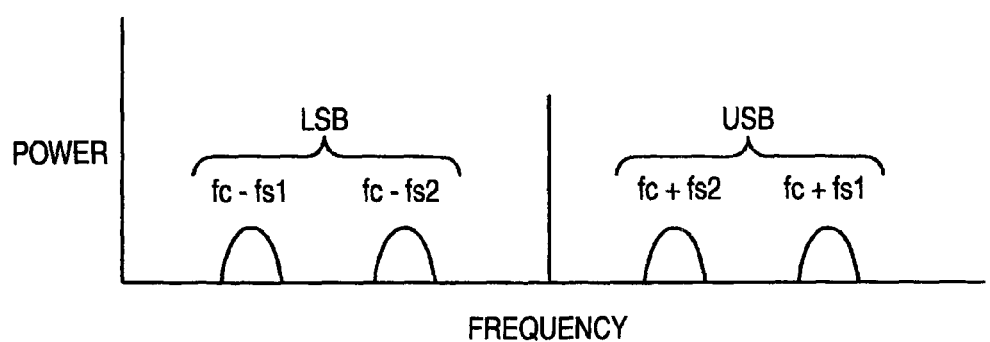

FIGS. 6A and 6B are schematic views describing a carrier wave, a response signal, USB and LSB where FSK is used.

As shown in FIG. 6A, a response signal (reflected wave) that the RFID tag 20 responds to is a signal obtained by synthesizing the first frequency fc and the second frequency fs and the third frequency fs2, which are sub carriers. For the response signal, data are expressed in the FSK system.

As shown in FIG. 6B, the response signal may obtain a number of components separated into USB and LSB and separated into the second frequency fs1 component and the third frequency fs2 component by separation of frequency components. In this case, three or more frequency components may be used, wherein a high-resolution power algorithm based on the MUSIC (Multiple Signal Classification) method disclosed by the International Publication WO2006/095463, etc., may be used. Accordingly, the accuracy under multi-pass environments can be improved with transmission frequency from the reader/writer 10 remaining as one frequency.

Figure 7:
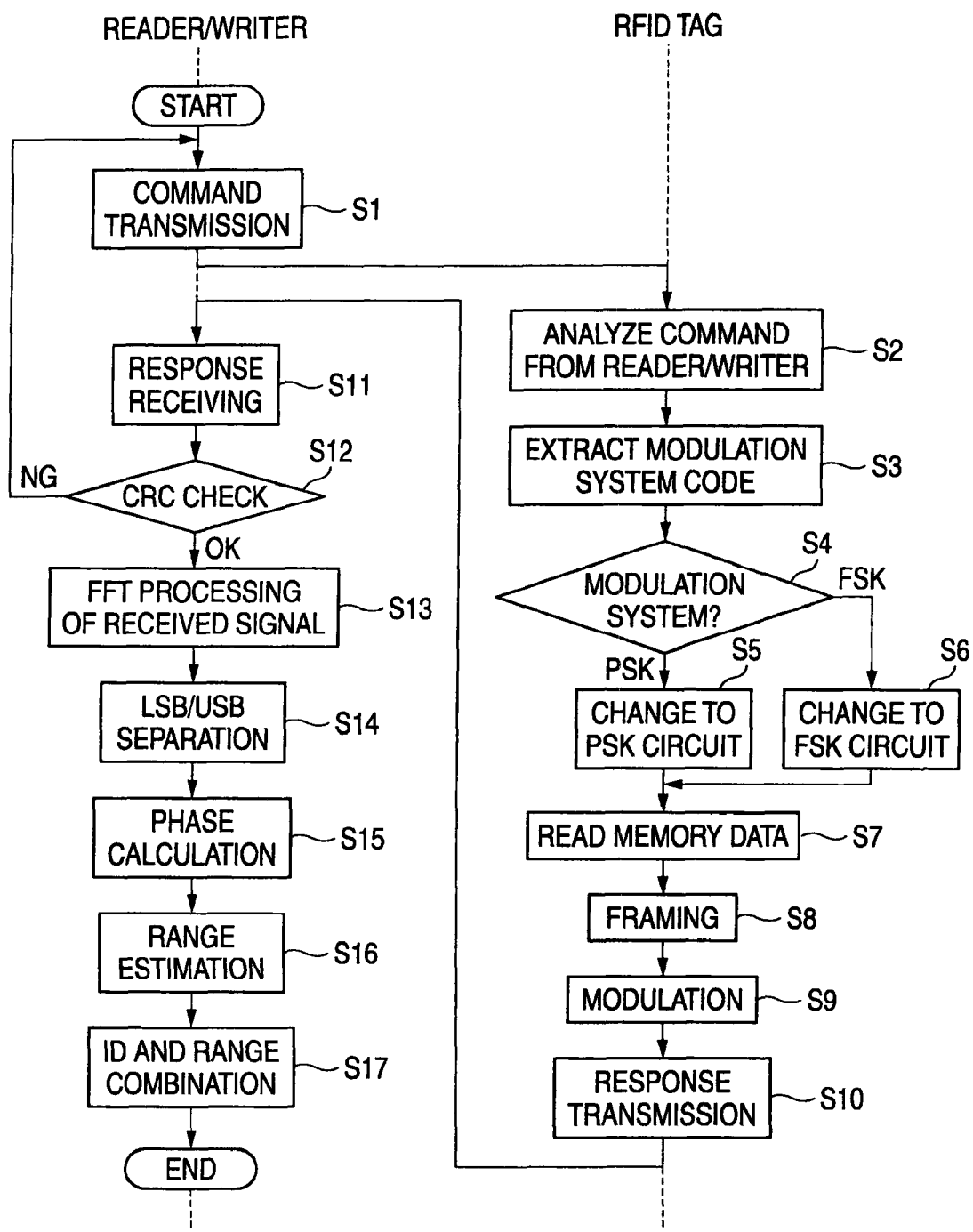
FIG. 7 is a flowchart showing actions of the range measuring system.

FIG. 7 is a flowchart showing actions when a range from the reader/writer 10 to the RFID tag 20 is obtained by the range measuring system 1.

First, the reader/writer 10 carries out command transmission and requests a response for ID from the RFID tag 20 (Step S1). At this time, the command is transmitted by the first frequency fc. Also, the command includes a modulation system code to determine whether the modulation system is based on PSK or FSK.

The RFID tag 20 analyzes the command from the reader/writer 10 (Step S2) and extracts the modulation system code.

If the modulation system is based on the PSK (Step S4: PSK), the RFID tag 20 changes the modulation portion 23 to the PSK circuit (Step S5).

If the modulation system is based on the FSK (Step S4: FSK), the RFID tag 20 changes the modulation portion 23 to the FSK circuit (Step S6).

The RFID tag 20 reads memory data stored in the memory 25 (this example includes ID) (Step S7), and frames by adding a preamble and CRC thereto (Step S).

The RFID tag 20 modulates framed data by the system (PSK or FSK) changed by Steps S4 through S6 (Step S9), and sends back a response signal (Response) (Step S10).

The reader/writer 10 receives a response signal (Response) (Step S11), and detects whether or not there is any error, by a CRC check (redundancy cyclic inspection) (Step S12).

If any error occurs (Step S12: NG), the reader/writer 10 returns the process to Step S1, and carries out the process again.

If there is no error (Step S12: OK), the reader/writer 10 carries out a process of FFT (Fast Fourier Transform) of the received signal by the frequency converting portion 15 (Step S13).

The reader/writer 10 further separates LSB and USB from each other by the frequency component separating portion 14 (Step S14), calculates a phase by the range calculating portion 13 (Step S15), and carries out estimation of the range based on the phase difference (Step S16).

The reader/writer 10 combines the calculated range with an ID included in the signals received in Step S11 and outputs the same (Step S17), and then terminates the process. Also, the output may be carried out by an appropriate method such as storing the output in a memory unit of the reader/writer 10, transmitting the same to another device connected to the reader/writer 10 or displaying the same in a display device secured at the reader/writer 10.

Based on the above-described configuration and actions, only by an inquiry signal being transmitted one time at a single frequency from the reader/writer 10, the reader/writer 10 receives a response signal including multiple frequency components from the RFID tag 20, and can calculate the range from the reader/writer 10 to the RFID tag 20.

Therefore, even if the REID tag 20, which is the object for range measurement, is moving at a high speed, it is possible to carry out highly accurate range measurements. That is, where a plurality of frequencies are transmitted from the reader/writer 10 one after another, if the RFID tag 20 is moving, accurate range measurements become difficult if the positions of the REID tag 20 differ from each other when transmitting respective frequencies. However, in the above-described embodiment, since an inquiry signal is transmitted one time at a single frequency, no time lag occurs, wherein accurate range measurements are enabled.

Also, since calculation is carried out by obtaining a phase difference of a sub carrier (the second frequency), it is possible to accurately measure the range by canceling the reflected wave.

In addition, since the frequency transmitted by the reader/writer 10 is regulated by the radio wave law, it was difficult to change the frequency of transmission waves as in the prior art.

However, since the frequency of reflected waves from the RFID tag 20 is not regulated, range measurement can be carried out by frequency separation using frequencies for which differences are sufficiently widened based on the above reason.

Where the PSK is used, a range can be simply measured.

Also, where the FSK is used, the RFID tag 20 returns reflected waves (response signals) with respect to a single frequency transmitted from the reader/writer 10, using frequency components, wherein the measurement accuracy can be improved by using multiple frequencies.

In addition, since the upper side band (USB) and the lower side band (LSB) are separated from each other, noise in the reflected waves can be separated, wherein highly accurate range measurement can be achieved.

Further, in the above-described embodiment, although PSK and FSK are used, the frequency separation is not limited thereto, but various methods may be used to separate frequencies to enable range measurement.

Figure 8:
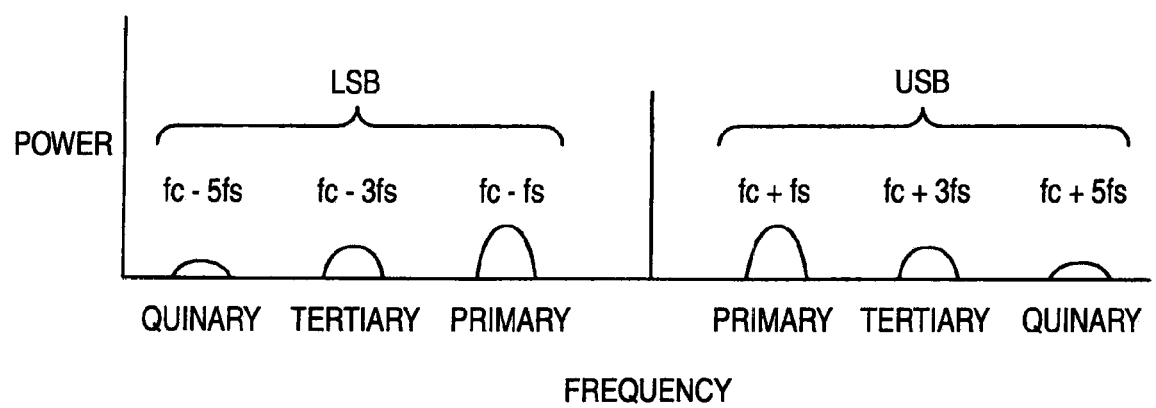
FIG. 8 is a schematic view describing a system utilizing high frequency components.

For example, the modulating portion 23 of the RFID tag 20 carries out modulation in the PSK system. The reader/writer 10 extracts high frequency components (odd-number order such as primary, tertiary, quinary, etc.) as shown in FIG. 8, and these high frequency components may be used. In this case, since three or more frequency components may be used, a high-resolution power algorithm based on the MUSIC method may be utilized. Therefore, the accuracy under a multiple-pass environment can be improved with the transmission frequency from the reader/writer 10 remaining as one frequency.

Furthermore, where such high frequency components are used, it is preferable that the RFID tag 20 is of a semi-passive type having a power source. Accordingly, power necessary to pick up high frequencies can be secured, and can be effectively utilized.

Figure 9:
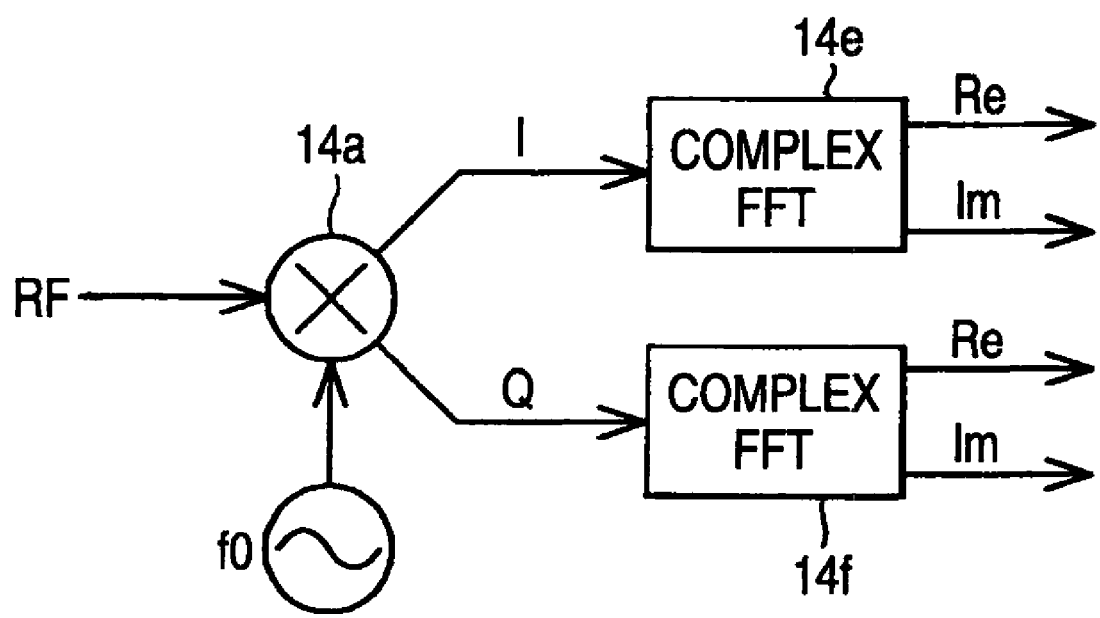
FIG. 9 is a configurational view of a frequency component separating portion that carries out complex FFT operations.

Also, as shown in FIG. 9, it may be composed that the frequency component separating portion 14 uses a complex FFT operation. In this case, received signals are separated into I signals and Q signals by the orthogonal mixer 14a, and the respective signals may be separated into real parts and imaginary parts by complex FFT operations 14e and 14f. And, USB components and LSB components for which addition and subtraction are further carried out are extracted, and phases of USB and LSB may be calculated from the respective I components and Q components.

In this case, the respective phases of USB and LSB may be obtained by the following mathematical expressions.

[Mathematical Expression 6]
Phase Delay of USB $$\Phi ru = Arctan(FFT(I)_{Re} + FFT(Q)_{Im})/(FFT(I)_{Im} - FFT(Q)_{Re})$$

*FFT $(I)_{Re}$: Real part separated from 1 signals by complex FFT operation

FFT$(I)_{Im}$: Imaginary part separated from 1 signals by complex FFT operation

FFT$(Q)_{Re}$: Real part separated from Q signals by complex FFT operation

FET$(Q)_{Im}$: Imaginary part separated from Q signals by complex FFT operation

Arctan(X): Function for calculation of arc-tangent of X

[Mathematical Expression 7]
Phase Delay of LSB $$\Phi rl = Arctan(FFT(I)_{Re} - FFT(Q)_{Im})/(FFT(I)_{Im} + FFT(Q)_{Re})$$

FFT$(I)_{Re}$: Real part separated from 1 signals by complex FFT operation

FFT$(I)_{Im}$: Imaginary part separated from 1 signals by complex FFT operation

FFT$(Q)_{Re}$: Real part separated from Q signals by complex FFT operation

FFT$(Q)_{Im}$: Imaginary part separated from Q signals by complex FFT operation

Arctan(X): Function for calculation of arc-tangent of X

In this case, only by an inquiry signal being transmitted from the reader/writer 10 one time at a single frequency, the reader/writer 10 receives a response signal from the RFID tag 20 corresponding thereto, and can calculate the range from the reader/writer 10 to the RFID tag 20.

In addition, the RFID tag 20 may be composed so as to function as a sensing device. In this case, the RFID tag 20 may be equipped with an appropriate sensor such as a temperature sensor, a humidity sensor, etc., instead of the memory portion 25 or connecting thereto. And, it may be composed that the RFID tag 20 frames a measurement value of the corresponding sensor as data, modulates the same and responds to the reader/writer.

Therefore, the reader/writer 10 can acquire sensing information in a non-contacted state, and is able to recognize by range calculation at which position (range) the sensing information has been obtained.

The composition of the invention matches or corresponds to the above-described embodiment as shown below;

The range measuring system according to the invention matches or corresponds to a range measuring system 1 according to the embodiment.

Similarly, the reader unit and range measuring apparatus match or correspond to the reader/writer 10, the communication unit matches or corresponds to the antenna 11, the range measuring unit matches or corresponds to the range calculating portion 13, the frequency component acquiring unit matches or corresponds to the frequency component separating portion 14, the non-contacted IC medium matches or corresponds to the RFID tag 20, the communications unit matches or corresponds to the antenna 21, and the modulating unit matches or corresponds to the modulating portion 23.

However, the invention is not limited to only the composition of the above-described embodiment, but may be subjected to various embodiments.

According to an aspect of the invention, it is possible to provide a range measuring method, a range measuring apparatus, a non-contacted IC medium and a range measuring system, which are capable of executing highly accurate range measurements even if the non-contacted IC medium is in motion.

What is claimed is:

1. A method of measuring a range from a reader unit to a non-contacted IC medium, the method comprising:
    transmitting an inquiry signal at a first frequency from the reader unit to the non-contacted IC medium;
    causing the non-contacted IC medium to perform modulation to modulate the first frequency by using a second frequency to obtain a modulated frequency, and causing the non-contacted IC medium to respond to the inquiry signal with a response signal at the modulated frequency, the response signal comprising an upper side band (USB) signal component and a lower side band (LSB) signal component;

causing the reader unit to receive the response signal to acquire a plurality of frequency components by extracting I and Q components from the response signal;

calculating from the extracted I and Q components a phase difference between the upper side band (USB) signal component and the lower side band (LSB) signal component; and measuring the range by using the calculated phase difference.

2. The method according to claim 1, wherein phase shift keying is used for the modulation.

3. The method according to claim 1, wherein frequency shift keying is used for the modulation.

4. The method according to claim 1, wherein
the modulation is digital modulation, and
the plurality of frequency components are high frequency components generated in the digital modulation.

5. The method according to claim 1, wherein the response signal is separated into the upper side band signal component and the lower side band signal component in order to acquire the plurality of frequency components.

6. The method according to claim 1, further comprising:
combining the range with an ID included in the response signal to create an ID-range; and
outputting the ID-range.

7. The method of claim 1, wherein the first frequency comprises a single frequency.

8. The method of claim 1, wherein the inquiry signal comprises a modulation system code for designating a modulation system and the non-contacted IC medium comprises a plurality of modulation circuits corresponding to a plurality of modulation systems, respectively, and is configured to select one of the modulation circuits corresponding to the modulation system designated by the modulation system code for use in said modulation performed by the non-contacted IC medium.

9. An apparatus, operable to measure a range from a reader unit to a non-contacted IC medium, the apparatus comprising:

a communication unit for transmitting an inquiry signal at a first frequency from the reader unit to the non-contacted IC medium and for receiving a response signal from the non-contacted IC medium, the response signal being generated by modulating the first frequency of the inquiry signal and comprising an upper side band (USB) signal component and a lower side band (LSB) signal component;

a frequency component acquiring unit for acquiring the plurality of frequency components from the received response signal by extracting I and Q components from the response signal; and a range measuring unit for calculating from the extracted I and Q components a phase difference between the upper side band (USB) signal component and the lower side band (LSB) signal component, and measuring the range by using the calculated phase difference.

10. A non-contact IC medium, comprising:

a communication unit for receiving an inquiry signal at a first frequency from a reader unit and for responding to the inquiry signal with a response signal to the reader unit, the response signal comprising an upper side band (USB) signal component and a lower side band (LSB) signal component;

a modulation unit far performing modulation to modulate the first frequency by using a second frequency to obtain a modulated frequency; and a plurality of modulation circuits corresponding to a plurality of modulation systems, respectively, wherein the communication unit responds to the inquiry signal with the response signal at the modulated frequency, and the response signal is generated by one of a selected one of said modulation circuits and has a plurality of frequency components that enable the reader unit to measure the range from the reader unit to the non-contact IC medium, and wherein the non-contact IC medium sends the response signal having a plurality of frequency components to the reader unit thereby enabling the reader unit to extract I and Q components from the response signal, calculate from the extracted I and Q components a phase difference between the upper side band (USB) signal component and the lower side band (LSB) signal component and measure the range from the reader unit to the non-contact IC medium using the calculated phase difference.

11. A range measuring system, comprising:

a non-contacted IC medium; and a range measuring apparatus operable to measure a range from a reader unit to the non-contacted IC medium, the apparatus comprising:

a first communication unit for transmitting an inquiry signal at a first frequency from the reader unit to the non-contacted IC medium and for receiving a response signal from the non-contacted IC medium, the response signal comprising an upper side band (USB) signal component and a lower side band (LSB) signal component;

a frequency component acquiring unit for acquiring a plurality of frequency components from the received response signal by extracting I and Q components from the response signal; and a range measuring unit for calculating from the extracted I and Q components a phase difference between the upper side band (USB) signal component and the lower side band (LSB) signal component and measuring the range by using the calculated phase difference, wherein the non-contacted IC medium comprises: a second communication unit for receiving the inquiry signal at the first frequency from the reader unit, and responding to the inquiry signal with a response signal to the reader unit; a modulation unit for performing modulation to modulate the first frequency by using a second frequency to obtain a modulated frequency; and a plurality of modulation circuits corresponding to a plurality of modulation systems, respectively, and wherein the second communication unit responds to the inquiry signal with the response signal at the modulated frequency, and generated by a selected one of said modulation circuits.

* * * * *